US010673196B2

(12) United States Patent
Washio

(10) Patent No.: US 10,673,196 B2
(45) Date of Patent: Jun. 2, 2020

(54) IN-VEHICLE FIXATION STRUCTURE

(71) Applicants: TOYOTA JIDOSHA KABUSHIKI KAISHA, Toyota-shi, Aichi-ken (JP); DENSO TEN Limited, Kobe-shi, Hyogo (JP)

(72) Inventor: Masanobu Washio, Kobe (JP)

(73) Assignees: TOYOTA JIDOSHA KABUSHIKI KAISHA, Toyota-shi (JP); DENSO TEN Limited, Kobe-shi (JP)

(*) Notice: Subject to any disclaimer, the term of this patent is extended or adjusted under 35 U.S.C. 154(b) by 0 days.

(21) Appl. No.: 16/180,521

(22) Filed: Nov. 5, 2018

(65) Prior Publication Data
US 2019/0199049 A1 Jun. 27, 2019

(30) Foreign Application Priority Data
Dec. 25, 2017 (JP) ................................ 2017-248108

(51) Int. Cl.
*G06F 1/16* (2006.01)
*H01R 43/26* (2006.01)
*H01R 33/97* (2006.01)
*H01R 33/965* (2006.01)
*B60R 11/02* (2006.01)
*G05B 19/042* (2006.01)
*H04B 1/3877* (2015.01)

(52) U.S. Cl.
CPC .......... *H01R 43/26* (2013.01); *B60R 11/0241* (2013.01); *B60R 11/0252* (2013.01); *G05B 19/042* (2013.01); *H01R 33/965* (2013.01); *H01R 33/97* (2013.01); *H04B 1/3877* (2013.01); *G05B 2219/2637* (2013.01); *H01R 2201/26* (2013.01)

(58) Field of Classification Search
USPC ........................................................ 710/303
See application file for complete search history.

(56) References Cited

U.S. PATENT DOCUMENTS

| 8,578,081 | B1 * | 11/2013 | Fils | ............................ | G06F 1/16 710/303 |
| 8,934,226 | B2 * | 1/2015 | Smith | .................... | G06F 1/1613 361/679.2 |
| 2006/0098403 | A1 * | 5/2006 | Smith | ........................ | G06F 1/16 361/679.08 |
| 2008/0308626 | A1 * | 12/2008 | Harper | .................... | G06K 19/08 235/380 |

(Continued)

FOREIGN PATENT DOCUMENTS

JP 2003-314613 A 11/2003
JP 6235314 B2 11/2017

*Primary Examiner* — Masud Ahmed
(74) *Attorney, Agent, or Firm* — Hunton Andrews Kurth LLP

(57) ABSTRACT

A card PC is pressed and held with a fixation guide from right and left sides and from the top, so that the card PC is securely fixed at a normal position, with reduced influence of vibration. After the card PC is placed at a normal position, a connector of an external device is moved to a connector of the card PC, so as to securely connect the card PC to the external device. This accordingly prevents disengagement of the connectors or other similar problems that would otherwise occur due to imperfect connection between the connectors.

6 Claims, 11 Drawing Sheets

(56) References Cited

U.S. PATENT DOCUMENTS

| | | | | |
|---|---|---|---|---|
| 2010/0123779 | A1* | 5/2010 | Snyder | G07C 5/0866 |
| | | | | 348/148 |
| 2010/0134964 | A1* | 6/2010 | Smith | B60R 11/0252 |
| | | | | 361/679.2 |
| 2011/0075876 | A1* | 3/2011 | Bucheim | H04M 1/04 |
| | | | | 381/365 |
| 2012/0280542 | A1* | 11/2012 | Wood | B60N 2/879 |
| | | | | 297/180.1 |
| 2015/0373479 | A1* | 12/2015 | Xia | H04W 4/70 |
| | | | | 455/420 |

* cited by examiner

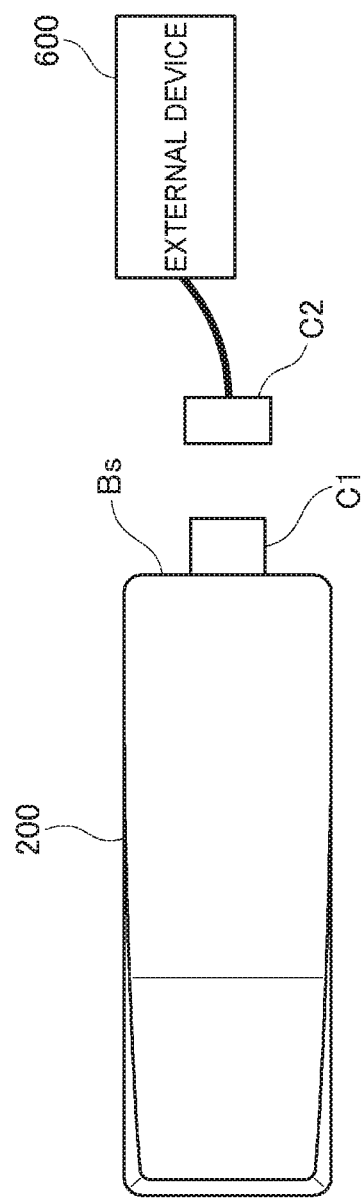

IN-VEHICLE FIXATION STRUCTURE

CROSS-REFERENCE TO RELATED APPLICATION

This application relates to and claims priority from Japanese Patent Application No. JP2017-248108, filed on Dec. 25, 2017, the entire disclosure of which is incorporated herein by reference.

BACKGROUND

Field

The present invention relates to an in-vehicle fixation structure for fixing an information terminal device in a vehicle.

Description of Related Art

Small, compact information terminal devices, such as stick PCs and card PCs, have been attracting attention in recent years. Such small information terminal devices are thought to be available for various applications. In one example, a small information terminal device can be used in a car by being connected to a navigation system in the car so that car passengers can enjoy high-resolution videos, music and games through the information terminal device.

Antivibration is one of the essential measures that should be taken upon installation of such small information terminal device in a car. A connector portion that connects the small information terminal device with an electronic device (e.g., a navigation system) in the car is in particular need of measures to prevent the occurrence of contact failure or a fall of the device due to vibration.

As an example of a structure for reducing the influence of vibration in a car, JP2003-314613 A discloses an antivibration structure that removably attaches a hard disk drive (HDD) unit, which is sensitive to vibration, into the housing of an in-vehicle electronic device (such as a navigation system) that is used in an extreme environment, wherein the antivibration structure provides an improved margin of safety against vibration. According to this antivibration structure, the vibration-sensitive HDD unit is mounted in a holder provided in the electronic device via a vibration attenuating means (e.g., vibration-proof rubber), and a guiding member guides the holder to its storage position in the housing of the electronic device, where an electric connection is made so as to electrically actuate the HDD unit as an internal element of the electronic device.

SUMMARY

However, the structure disclosed in JP2003-314613 A has the disadvantage of requiring users, etc., to conduct a complicated process to attach/detach the HDD unit to/from the holder of the electronic device. Another problem of the structure is that the vibration attenuating means between the HDD unit and the electronic device is still insufficient in terms of vibration resistance.

The present invention has been made in view of the above-described circumstances. An object of the present invention is to provide an in-vehicle fixation structure capable of easily and securely connecting an information terminal device with an in-vehicle electronic device, while achieving sufficient resistance to vibration.

According to an aspect of the present invention, an in-vehicle fixation structure for fixing an information terminal device in a vehicle is provided, such structure including: a detection sensor that detects whether the information terminal device is placed on a mounting stage in the vehicle; a fixation guide for fixing the information terminal device onto the mounting stage; and a controller. The in-vehicle fixation structure is characterized in that the controller includes a guide controller that, in response to the detection of the information terminal device by the detection sensor, controls the fixation guide so as to press and hold at least two opposite side surfaces of the information terminal device in a direction toward center, and a connection controller that, after the information terminal device is pressed and held by the fixation guide, connects the information terminal device to an external device by moving a connector of the external device toward a connector of the information terminal device and engaging the connectors with each other.

According to another aspect of the present invention, an in-vehicle fixation structure for fixing an information terminal device in a vehicle is provided, such structure including: a terminal device storage section including a mounting stage in the vehicle; a shutter that covers a portion above the terminal device storage section; a detection sensor that detects whether the information terminal device is placed on the mounting stage; a fixation member for fixing the information terminal device onto the mounting stage; and a controller. The in-vehicle fixation structure is characterized in that the controller includes: a shutter controller that, in response to the detection of the information terminal device by the detection sensor, closes the shutter so as to cover an upper surface of the information terminal device; a gap filling controller that, after the shutter is closed, fills a gap created between the terminal device storage section and a lower surface and a front end portion of the information terminal device with the fixation member; and a connection controller that, after the gap is filled with the fixation member, connects the information terminal device to an external device by moving a connector of the external device to a connector of the information terminal device and engaging the connectors with each other.

BRIEF DESCRIPTION OF DRAWINGS

FIGS. 8A to 8C each schematically illustrate a cross-section of an in-vehicle fixation structure 1000a.

FIG. 11 illustrates an example of a stick PC.

DETAILED DESCRIPTION

Hereinafter, embodiments of the present invention will be specifically described with reference to the attached drawings. In the below description, the same elements will be given the same reference signs and any repetitive descriptions will be omitted.

A. First Embodiment

Figure 1:
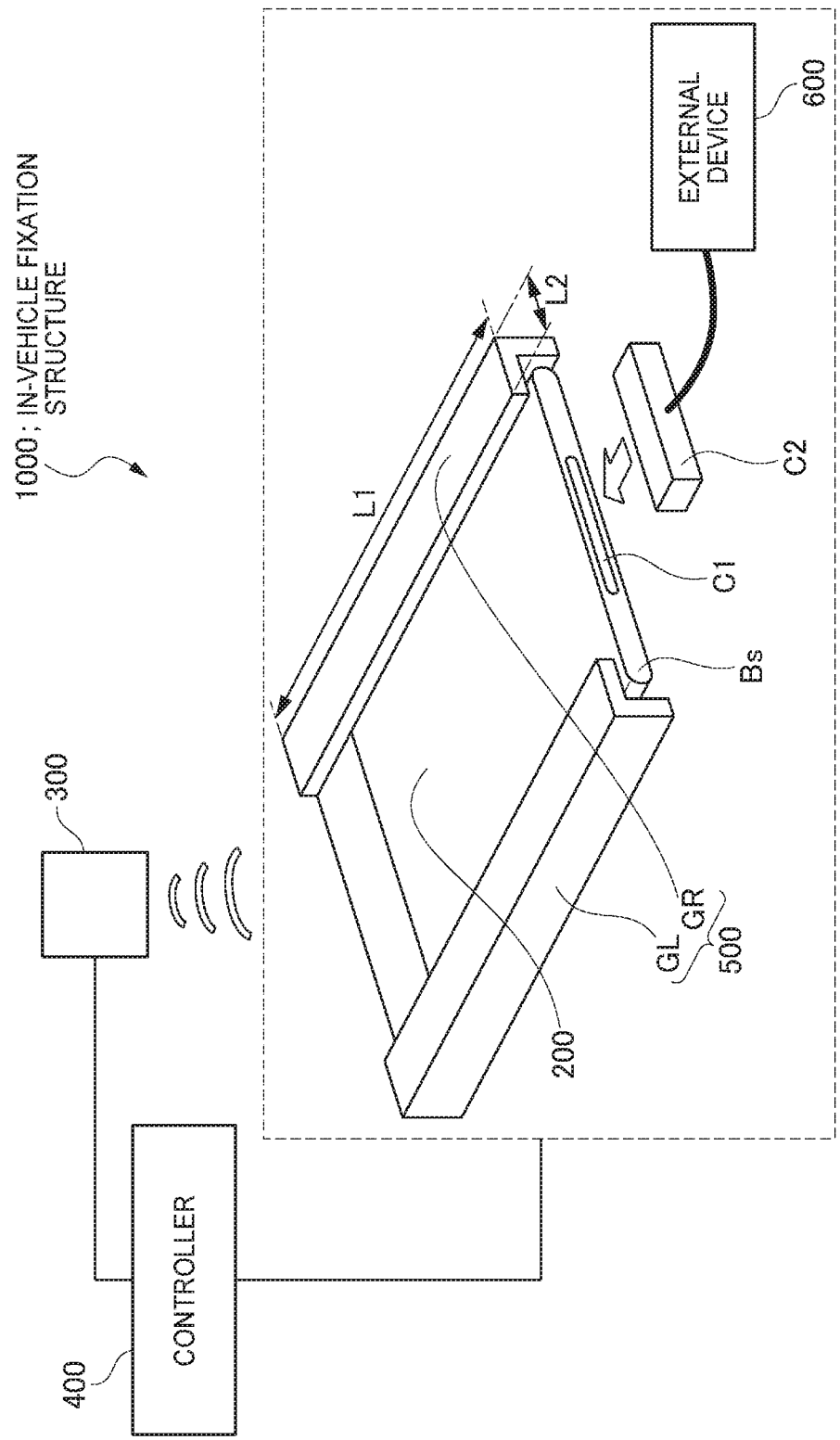
FIG. 1 illustrates an external appearance of an in-vehicle fixation structure according to a first embodiment.
Figure 2:
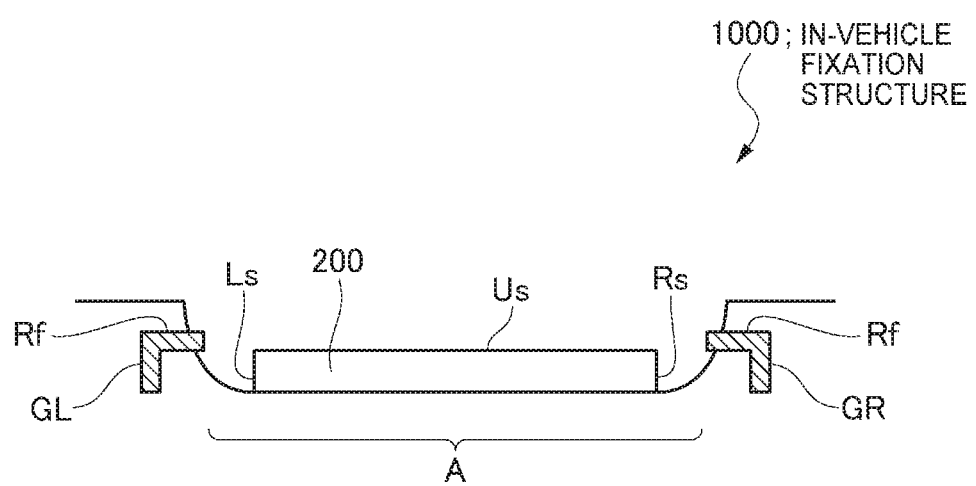
FIG. 2 is a cross-sectional view of a major portion of an in-vehicle fixation structure.

FIG. 1 illustrates an external appearance of an in-vehicle fixation structure 1000 according to a first embodiment. FIG. 2 illustrates a cross-section of the major portion of the in-vehicle fixation structure 1000. The embodiments described below refer to examples in which a small information terminal device 200, such as a stick PC or card PC (in the present embodiment, such small information terminal device 200 is assumed to be a card PC), is fixed in a vehicle by using the in-vehicle fixation structure 1000. However, the present invention is not limited to the above and may also be used for fixing various electronic devices (information terminal devices), such as tablets, wearable devices and notebook PCs, in a vehicle.

Figure 3A:
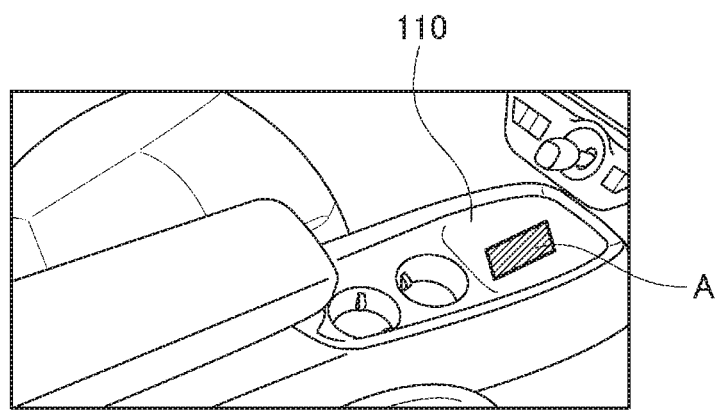
FIGS. 3A and 3B each illustrate an example of a mounting area of an in-vehicle fixation structure.
Figure 3B:
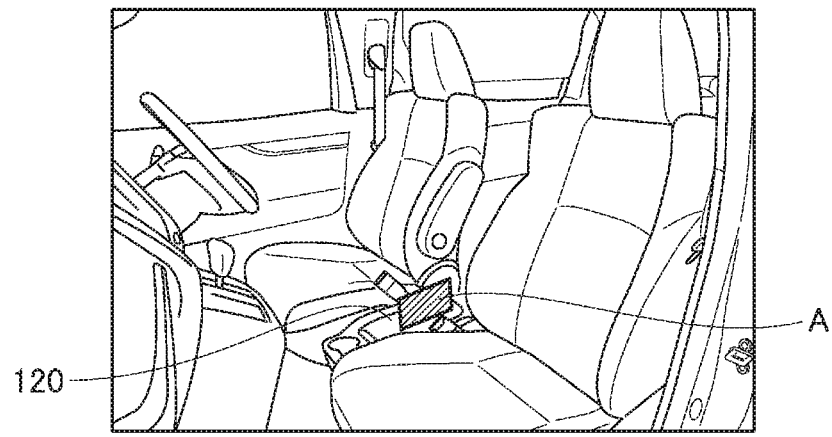

As illustrated in FIGS. 3A and 3B, the in-vehicle fixation structure 1000 is provided in an area A in which the card PC 200 can be placed and mounted (such area will also be referred to hereinafter as the "mounting area"), such as a center console 110 and a console box 120. For example, the card PC 200 may be designed to have a main body size of 945 mm in width, 55 mm in depth and 5 mm in height, and to include a processor having a CPU, a ROM, a RAM, etc., various types of memory and storage, and various devices for wireless communications (e.g., Wi-Fi, Bluetooth®).

The card PC 200 has a communication interface for connection with an external device 600 on its back side Bs. The interface may be, for example, a USB Type-C connector C1 that meets the standards for connectors. An example of the external device 600 is a car navigation device. However, the external device is not limited and may be any electronic device, such as a liquid crystal panel or a mobile terminal that can be connected to the card PC 200.

The in-vehicle fixation structure 1000 has a card detection sensor 300 that detects the card PC 200 placed on the mounting area A. Examples of the card detection sensor 300 include a mass sensor and an infrared sensor. Alternatively, various types of cameras (e.g., CMOS cameras) may also be used as the card detection sensor 300. When a camera is used as the card detection sensor 300, such sensor can detect not only the placement of the card PC 200 on the mounting area A, but can also detect whether the card PC 200 is placed on the mounting area A in a correct orientation (i.e., whether the back side Bs of the card PC 200 faces the connector C2 of the external device), as well as whether the card PC 200 is upside down and whether the placed card PC 200 is of a correct type.

A controller 400 may include, for example, a micro controller unit (MCU), and such MCU may have a CPU, a ROM, a RAM, etc., as major components thereof. The controller 400 performs overall control of each part of the in-vehicle fixation structure 1000 by executing various programs, etc., stored on the ROM and RAM.

A fixation guide 500 is provided along the longer side of the card PC 200 placed on the mounting area A. The fixation guide 500 is comprised of a pair of metal guides (a left metal guide GL and a right metal guide GR), each having an approximately inverted L-shape when shown in cross-section.

Under the control by the controller (guide controller) 400, the fixation guide 500 presses and holds the two side surfaces Rs and Ls of the card PC 200 placed on the mounting area A from the right and left sides toward the center, and also presses and holds the upper surface Us of the card PC 200 toward the center, so as to thereby fix the card PC 200 substantially in the center of the mounting area A (specifically, at a position that enables connection to the connector C2 of the external device 600; hereinafter, such position will also be referred to as a "normal position").

The reason for pressing and holding the card PC 200 not only from the right and left sides, but also from the top, is that the card PC 200 may be insufficient in terms of resistance to vibration if it is pressed and held by the fixation guide only from the two sides. Thus, the fixation guide 500 in the present embodiment is configured to press and hold the card PC 200 not only from the right and left sides, but also from the top. Specifically, each of the paired metal guides GL and GR has a roof Rf, and this enables the card PC 200 to be pressed and held from the top. It should be noted here that the length L1 of each of the metal guides GL, GR, and the projecting length L2 of the roof Rf may be determined as appropriate so as to enable fixation of the card PC 200. Furthermore, a (heat-resisting) shock absorbing material may be provided at an inner side of the fixation guide 500 (i.e., at a portion where the fixation guide 500 comes into contact with the card PC 200).

Next, the processing starting from the placement of the card PC 200 on the mounting area A to the connection of the card PC 200 with the external device 600 will be described with reference to FIGS. 4A to 4D and FIG. 5.

FIGS. 4A to 4D each schematically illustrate a cross-section of the in-vehicle fixation structure 1000. FIG. 5 shows the flowchart of the fixation processing performed by the controller 400.

Figure 4A:
FIGS. 4A to 4D each schematically illustrate a cross-section of an in-vehicle fixation structure.
Figure 4B:
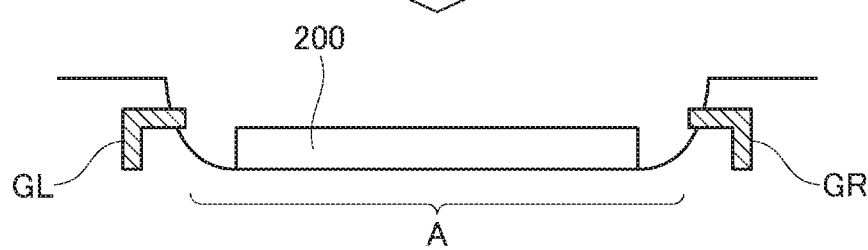
Figure 5:
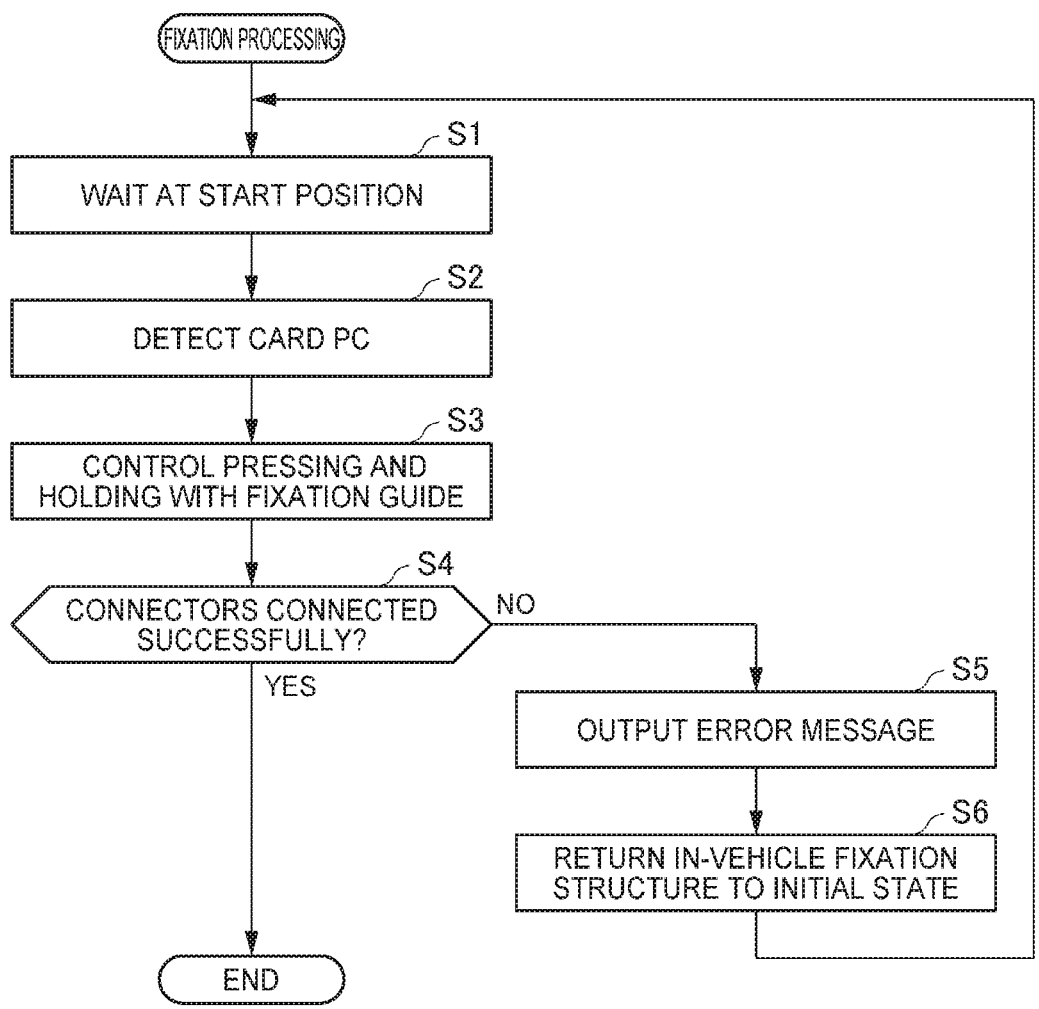
FIG. 5 is a flowchart showing the fixation processing.

As illustrated in FIG. 4A, the fixation guide 500 waits at a start position Ps before the card PC 200 is placed on the mounting area A (step S1). When the user (e.g., the driver of the vehicle) places the card PC 200 on the mounting area A, as shown in FIG. 4B, the card detection sensor 300 sends a message to the controller 400 indicating that the card PC 200 has been detected.

Figure 4C:
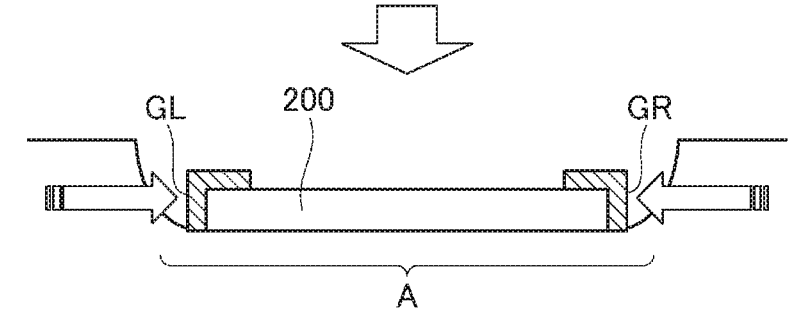
Figure 4D:
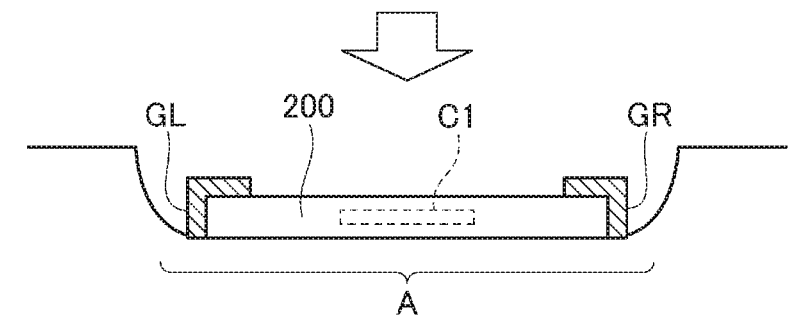

In response to receiving the message indicating the detection of the card PC 200 (step S2), the controller (guide controller) 400 controls the fixation guide 500 so as to press and hold the card PC 200 from the right and left sides and from the top, so that the card PC 200 is placed substantially in the center of the mounting area A (i.e., at the normal position) (step S3; see FIG. 4C). The controller (connection controller) 400 then moves a connector C2 of the external device 600 toward the connector C1, which is provided on the back side Bs of the card PC 200, and engages the card PC 200 with the external device 600 to establish connection between the connectors (step S4). When a connection is successfully made between the connectors of the card PC 200 and the external device 600 (YES in step S4), the controller 400 ends the above-described processing.

When a connection between the respective connectors of the card PC 200 and the external device 600 fails for any reason (such as due to the card PC 200 being placed in an incorrect orientation or upside down, or the type of the placed card not being correct) (NO in step S4), the controller (connection controller) 400 flashes a lamp or outputs a voice message to indicate the error (step S5). The controller (guide controller) 400 then resets the in-vehicle fixation structure 1000 to the initial state by, for example, moving the fixation guide 500 back to the start position Ps (i.e., the position before the pressing and holding of the card PC 200) (step S6), and returns to step S1. In response to the error message, etc., the user again places the card PC 200 on the mounting area A. The card detection sensor 300 detects that the card PC 200 has been placed again, and then sends a message indicating such detection of the card PC 200 to the controller 400. After that, the same steps as those described above will be performed again (so the repetitive description thereof will be omitted here).

As described above, the present embodiment presses and holds the card PC 200 from the right and left sides and from the top through the use of the fixation guide 500, so that the card PC 200 can be securely fixed at a normal position and can also be insulated from the influence of vibration. Moreover, the present embodiment moves the connecter C2 of the external device 600 toward the connector C1 of the card PC 200 after the card PC 200 is placed at the normal position, and then engages the connectors with each other, so as to accordingly connect the card PC 200 and the external device 600 securely with each other. This configuration prevents disengagement of the connectors or other similar problems that would otherwise occur due to imperfect connection between the connectors.

While the process for connecting the card PC 200 and the external device 600 has been described above, the process for disconnecting (releasing) the card PC 200 from the external device 600 can be described in a similar manner to the above.

Figure 6:
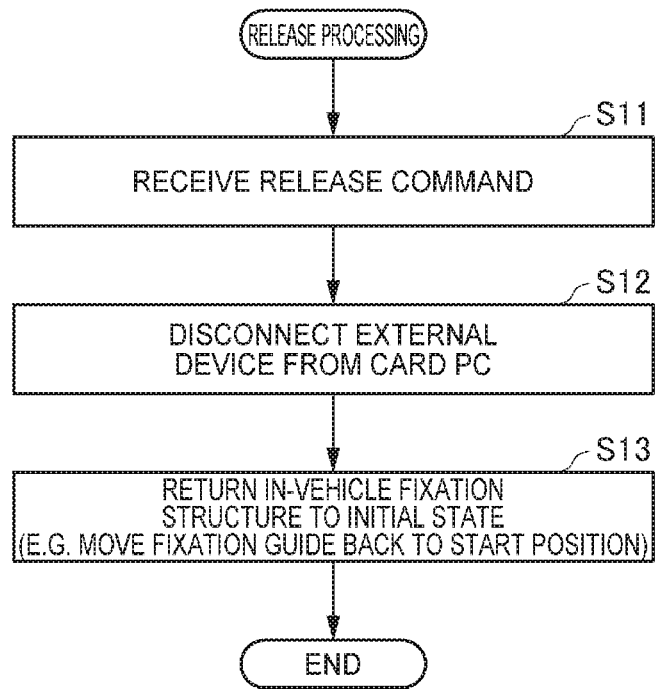
FIG. 6 is a flowchart showing the release processing.

FIG. 6 is a flowchart showing the release processing performed by the controller 400.

The controller (connection controller) 400 receives a command to disconnect the card PC 200 and the external device 600 (step S11), and, in response to the command, disengages the connector C2 of the external device 600 from the card PC 200 (step S12).

After that, the controller (guide controller) 400 returns the in-vehicle fixation structure 1000 to the initial state by, for example, moving the fixation guide 500 back to the start position Ps (i.e., the position before the pressing and holding of the card PC 200) (step S13), and ends the processing. It should be noted here that a command to disconnect the card PC 200 and the external device 600 may be configured so as to be provided to the controller 400, for example, when an accessory (ACC) power is turned off, or when the user performs a prescribed operation.

The above embodiment describes an example in which the paired metal guides GL and GR each have a roof Rf that partly covers the upper surface Us of the card PC 200 so as to press and hold the card PC 200 from the top, but the configuration is not limited thereto. For example, the metal guides GL and GR may each have a roof Rf that entirely covers the upper surface Us of the card PC 200.

Alternatively, a guide for pressing and holding the upper surface Us of the card PC 200 from the top may be provided separately from the guides for pressing and holding the two side surfaces Rs and Ls of the card PC 200 from the right and left sides, and the controller 400 may control each of these guides, thereby achieving the pressing and holding of the card PC 200 with the guides.

It should be noted here that the guide for pressing and holding the upper surface Us of the card PC 200 from the top may be optional because the use of the guides for pressing and holding the two side surfaces Rs and Ls of the card PC 200 from the respective sides can sufficiently reduce the influence of vibration. For example, a pair of metal guides, each being substantially I-shaped, instead of substantially inverted L-shaped, in its cross section, may be used instead.

B. Second Embodiment

Figure 7:
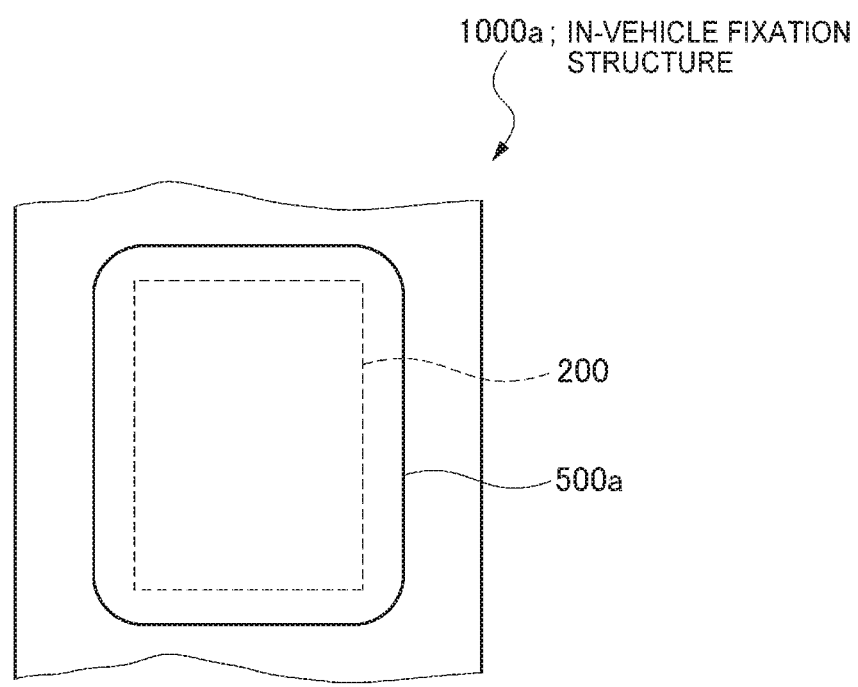
FIG. 7 illustrates, from the top, a major portion of an in-vehicle fixation structure according to a second embodiment.
Figure 8A:
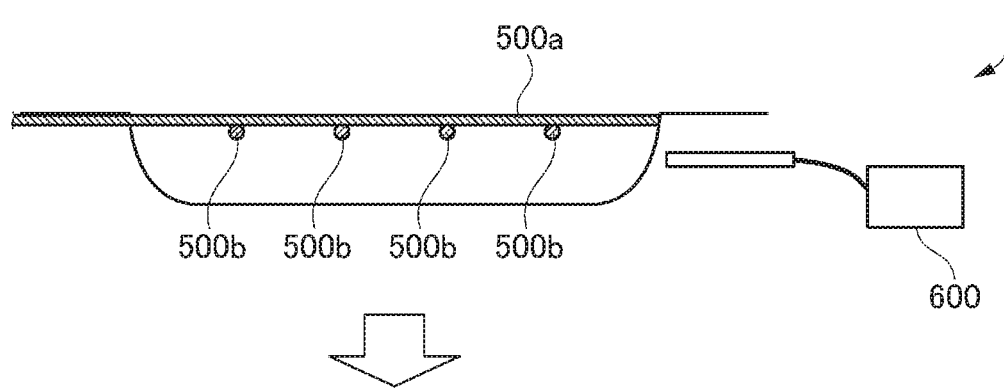
Figure 8B:
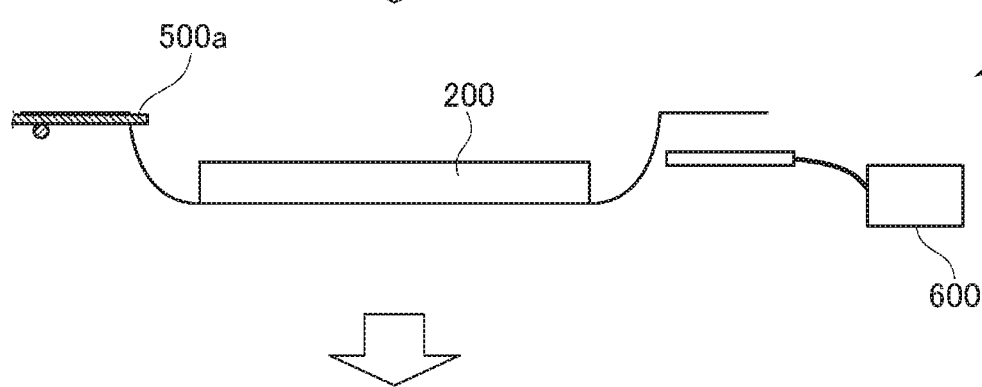
Figure 8C:
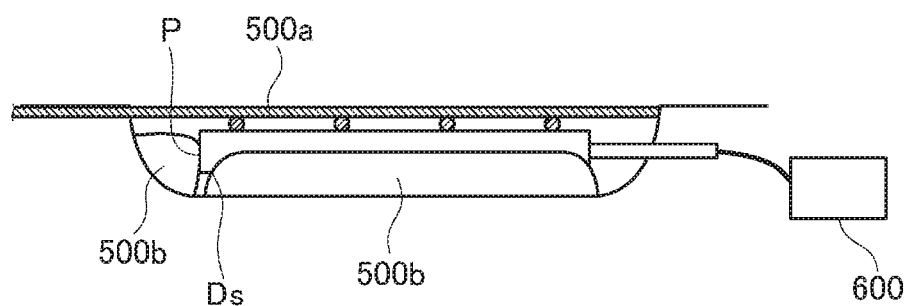

FIG. 7 is a top view of the major portion of an in-vehicle fixation structure 1000a according to the second embodiment. FIGS. 8A to 8C schematically illustrate a cross-section of this in-vehicle fixation structure 1000a. In the in-vehicle fixation structure 1000a shown in FIGS. 7 and 8A to 8C, portions that correspond to the portions in the in-vehicle fixation structure 1000 shown in FIGS. 1, 2 and 4A to 4D will be given the same reference numerals, and the specific descriptions thereof will be omitted.

The in-vehicle fixation structure 1000a according to the second embodiment comprises a shutter 500a and a fixation member 500b.

The shutter 500a prevents the entry of foreign matter, etc., into a storage section (terminal device storage section) 500C that stores the card PC 200 therein. The shutter 500a also functions to restrict movement of the upper portion of the card PC 200. The shutter 500a may be made of, for example, polyvinyl chloride or metal. The opening/closing operation of the shutter 500a is controlled by the controller 400. For example, the controller 400 may control the shutter 500a so as not to be open (i.e., to maintain the "closed state" of the shutter 500a) while the vehicle is moving or if the card PC 200 is connected to the connector C2 of the external device 600.

The fixation member 500b may be a member that functions for both fixation and heat absorption (e.g., a damper), and a variety of materials, including polyethylene, rubber, and a gel material such as a shock absorbing gel, may be used to form the fixation member 500b. When the shutter 500a is closed, the controller (gap filling controller) 400 controls the shape and position of the fixation member 500b in a manner so as to close (fill) the gap made between the storage section 500C and the lower surface Ds and the front end portion P of the card PC 200. Although the present embodiment describes an example in which the fixation member 500b is also bonded to the back side of the shutter 500a (i.e., the surface of the shutter 500a that faces the card PC 200 when the shutter 500a is closed), such fixation member 500b attached to the back side of the shutter 500a may be optional.

Figure 9:
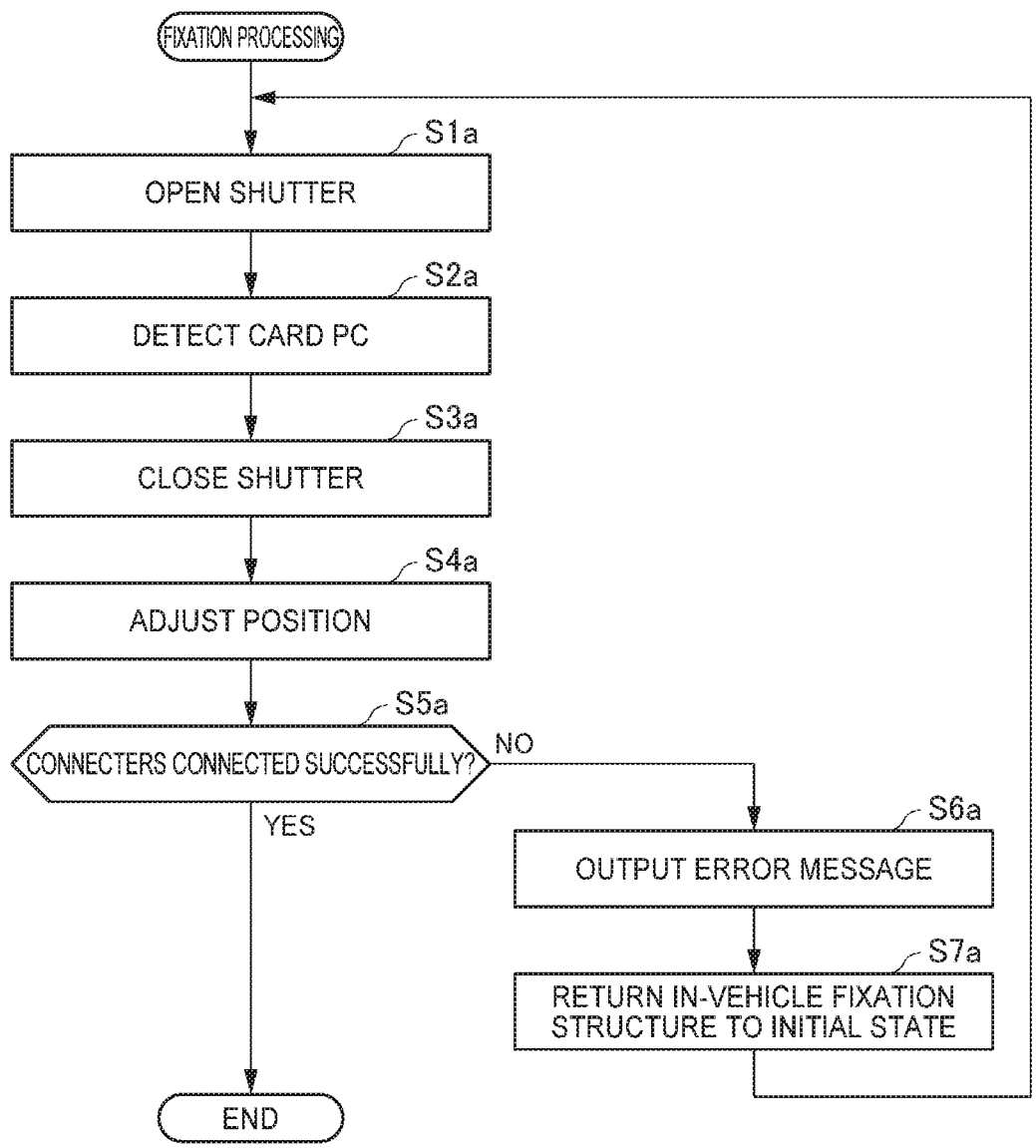
FIG. 9 is a flowchart showing the fixation processing.

FIG. 9 is a flowchart showing the fixation processing performed by the controller 400 according to the second embodiment. The below description will be made by assuming that the shutter 500a is closed in its initial state (see FIG. 8A); however, the shutter 500a may be set to be open in its initial state.

When a command to place the card PC 200 is entered through a user's operation via a prescribed button, etc., the controller 400 performs control so as to open the shutter 500a (step S1a). After that, when the user places the card PC 200 at a mounting area A in the storage section 500C (see FIG. 8B), the card detection sensor 300 sends the controller 400 a message indicating the detection of the card PC 200.

In response to receiving the message indicating the detection of the card PC 200 (step S2a), the controller (shutter controller) 400 performs control so as to close the shutter 500a so that the card PC 200 is placed substantially at the center (i.e., at a normal position) in the mounting area A (step S3a). The controller (gap filling controller) 400 then controls the shape and position of the fixation member 500b so as to close (fill) the gap generated between the storage section 500C and the lower surface Ds and the front end portion P of the card PC 200, and thereby allows the card PC 200 to closely adhere to the shutter 500a and adjusts the position of the card PC 200 (step S4a; see FIG. 8C).

The controller (connection controller) 400 then moves the connector C2 of the external device 600 toward the connector C1 of the card PC 200, and engages the card PC 200 with the external device 600, thereby attempting to establish a connection between the connectors (step S5a). When a connection is successfully made between the respective connectors of the card PC 200 and the external device 600 (YES in step S5a), the controller 400 ends the above-described processing.

When a connection between the respective connectors of the card PC 200 and the external device 600 fails for any reason (such as due to the card PC 200 being placed in an incorrect orientation or upside down, or the type of the card placed not being correct) (NO in step S5a), the controller (connection controller) 400 flashes a lamp or outputs a voice message to indicate the error (step S6a). The controller (gap filling controller, shutter controller) 400 then resets the in-vehicle fixation structure 1000a to its initial state by, for example, turning the fixation member 500b in the gap back into the original shape and position before the filling of the gap and then controlling the shutter 500a to open (step S7a). The controller 400 thereafter returns to step S1a. In response to the error message, etc., the user again places the card PC 200 at the mounting area A. The card detection sensor 300 detects that the card PC 200 has been placed again, and then sends a message to the controller 400 indicating such detection of the card PC 200. After that, the same steps as those described above will be performed again (so the repetitive description thereof will be omitted here).

As described above, the card PC 200 can also be fixed securely to a normal position through the use of the shutter 500a and the fixation member 500b. Similarly to the first embodiment, the connecter C2 of the external device 600 is moved to the connector C1 of the card PC 200 after the card PC 200 is placed at the normal position, and this achieves secure connection between the card PC 200 and the external device 600. The configuration accordingly prevents disengagement of the connectors and other similar problems that would otherwise occur due to imperfect connection between the connectors.

While the process for connecting the card PC 200 and the external device 600 has been described above, the process for disconnecting (releasing) the card PC 200 from the external device 600 can be described in a similar manner to the above.

Figure 10:
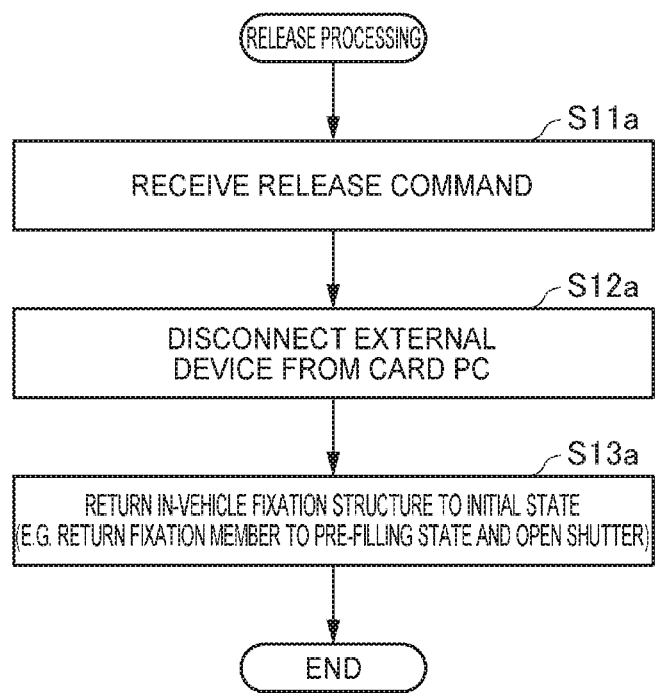
FIG. 10 is a flowchart showing the release processing.

FIG. 10 is a flowchart showing the release processing performed by the controller 400.

The controller (connection controller) 400 receives a command to disconnect the card PC 200 and the external device 600 (step S11a), and, in response to the command, disengages the connector C2 of the external device 600 from the connector C1 of the card PC 200 (step S12a). After that, the controller (gap filling controller, shutter controller) 400 returns the in-vehicle fixation structure 1000a to its initial state by, for example, turning the fixation member 500b in the gap back into the original shape and position before the filling of the gap and then controlling the shutter 500a to open (step S13a). The controller 400 then ends the processing. It should be noted here that, similarly to the first embodiment, a command to disconnect the card PC 200 and the external device 600 may be configured to be provided to the controller 400, for example, when an accessory (ACC) power is turned off, or when the user performs a prescribed operation.

C. Other Embodiments

The present invention is not limited to the embodiments described above, and may be carried out in various ways without departing from the gist of the present invention. Accordingly, the above-described embodiments are by way of example only in terms of every aspect, and should not be interpreted in a limiting manner. For example, each of the steps in the above-described processing may be performed in a different order, or two or more steps may be performed in parallel, as long as such change causes no contradiction in the content of the processing.

For example, when the card detection sensor 300 is a camera, the camera can detect not only the placement of the card PC 200 at the mounting area A, but can also detect whether the card PC 200 is placed in an incorrect orientation, the card PC 200 is placed upside down, or whether the type of the card PC 200 placed is not correct. Accordingly, the card detection sensor 300 may be configured so as to provide an error message (e.g., output a voice message or flash an error lamp) to the controller 400 upon the detection of such errors.

Although the above embodiments have described an example of fixing the card PC 200, like the one illustrated in FIG. 1, an example of fixing a stick PC 200 as shown in FIG. 11 can also be described in a similar manner. The back side Bs of such stick PC 200 may be provided with, for example, a connector C1 that meets the HDMI (High-Definition Multimedia Interface) standards, and the external device 600 may be provided with a connector C2 that also meets the HDMI standards. The connector C2 of the external device 600 is moved to the connector C1 of the stick PC 200 and the stick PC 200 is then engaged with the external device 600. With this configuration, a secure connection can be made between the stick PC 200 and the external device 600. It should be noted here that the connector C1 in the above-described examples is provided at the back side Bs of the card PC 200 or the stick PC 200, but the connector C1 may be provided at a position other than the back side Bs.

The order of the steps in the processing described herein may be changed as appropriate, or two or more of the steps may be performed in parallel, to the extent that such change causes no contradiction in the content of the processing.

A program for executing the processing described herein may be stored on a storage medium. With the use of such storage medium, the program stored on the medium can be installed on a computer that constitutes the in-vehicle fixation structure 1000, 1000a. The storage medium storing the program may be a non-transitory storage medium. Examples of such non-transitory storage medium include, but are not particularly limited to, CD-ROMs.

The present invention enables the easy and secure connection of an information terminal device to an in-vehicle electronic device, while achieving sufficient resistance to vibration.

What is claimed is:

1. An in-vehicle fixation structure for fixing an information device in a vehicle, comprising:
    a detection sensor that detects whether the information device is placed on a mounting stage in the vehicle;
    a fixation guide for fixing the information device onto the mounting stage, the fixation guide includes a pair of fixation guides, each having a cross section in a substantially inverted L-shape; and
    a controller, wherein the controller comprises
        a guide controller that, in response to the detection of the information device by the detection sensor, controls and moves the fixation guide so as to press and hold at least two opposite side surfaces and an upper surface of the information device in a direction toward center, and
        a connection controller that, after the information device is pressed and held by the fixation guide, connects the information device to an external device by moving a connector of the external device toward a connector of the information device and engaging the connectors with each other.

2. The in-vehicle fixation structure according to claim 1, wherein:
in response to receiving a command to disconnect the information device from the external device, the connection controller disengages the connector of the external device from the information device; and
when the connector of the external device is disengaged from the information device, the guide controller returns the fixation guide to an original position before the pressing and holding of the information device.

3. The in-vehicle fixation structure according to claim 1, wherein:
the connection controller outputs an error message when the connection between the information device and the external device fails; and
in response to the error message, the guide controller returns the fixation guide to an original position before the pressing and holding of the information device.

4. An in-vehicle fixation structure for fixing an information device in a vehicle, comprising:
a terminal device storage section including a mounting stage in the vehicle;
a shutter that covers a portion of the terminal device storage section;
a detection sensor that detects whether the information device is placed on the mounting stage;
a fixation member for fixing the information device onto the mounting stage; and
a controller, wherein the controller comprises
a shutter controller that, in response to the detection of the information device by the detection sensor, automatically closes the shutter so as to cover an upper surface of the information device,
a gap filling controller that, after the shutter is closed, fills a gap created between the terminal device storage section and a lower surface and a front end portion of the information device with the fixation member, and
a connection controller that, after the gap is filled with the fixation member, connects the information device to an external device by moving a connector of the external device to a connector of the information device and engaging the connectors with each other.

5. The in-vehicle fixation structure according to claim 4, wherein
in response to receiving a command to disconnect the information device from the external device, the connection controller disengages the connector of the external device from the information device;
when the connector of the external device is disengaged from the information device, the gap filling controller returns the fixation member in the gap to an original state before the filling of the gap; and
the shutter controller opens the shutter when the fixation member is returned to an original position before the filling of the gap.

6. The in-vehicle fixation structure according to claim 4, wherein
the connection controller outputs an error message when the connection between the information device and the external device fails, in response to the error message, the gap filling controller returns the fixation member in the gap to an original state before the filling of the gap; and
the shutter controller opens the shutter when the fixation member is returned to an original position before the filling of the gap.

* * * * *